3,487,060
PRODUCTION OF GRANULAR POLYVINYL ALCOHOL

John E. Bristol, Niagara Falls, N.Y., assignor to E. I. du Pont de Nemours and Company, Wilmington, Del., a corporation of Delaware
No Drawing. Filed Feb. 23, 1968, Ser. No. 707,450
Int. Cl. C08f 3/34
U.S. Cl. 260—89.1                                         5 Claims

ABSTRACT OF THE DISCLOSURE

Granular polyvinyl alcohol is produced continuously by continuously feeding to an agitated alcoholysis mixture, in which is maintained an effective concentration of alcoholysis catalyst, a solution of a 10–40% alcoholized polyvinyl ester in a solvent mixture of the hydrolytic alcohol and the by-product ester of that alcohol with the acid residue of the polyvinyl ester, the rate of feed of such solution being such that the concentration of dissolved polymer in the alcoholysis mixture does not exceed about 1% by weight, while continuously withdrawing from the alcoholysis mixture a slurry of granular polyvinyl alcohol product in a solvent mixture of the hydrolytic alcohol and the by-product ester.

BACKGROUND OF THE INVENTION

The production of polyvinyl alcohol by the acid- or alkali-catalyzed alcoholysis of a polyvinyl ester in a hydrolytic alcohol is well known. When a polyvinyl ester such as polyvinyl acetate is alcoholized in an alcohol such as methanol, the polymer remains soluble in the solvents present in the alcoholysis mixture until about 45% of the acetate groups have been replaced by hydroxyl groups, i.e., until the polymer has been about 45% alcoholized. Alcoholysis beyond that point produces polymer which is insoluble in the solvent mixture, e.g., a mixture of methanol and by-product methyl acetate then present, which insoluble polymer takes the form of a gel of polymer molecules associated with methanol of solvation. As solubility decreases by further alcoholysis, this gel becomes tougher and then begins to reject the associated solvent. When alcoholysis is complete, the polymer and solvent are mutually insoluble.

One well-known method for continuously producing polyvinyl alcohol while avoiding the necessity of employing heavy-duty mixing devices such as kneaders to prevent the alcoholysis mixture setting up to a motionless gelled mass during the intermediate stages of alcoholysis, is that described in Bristol and Tanner U.S. Patent 2,734,048. That method avoids the requirement of heavy-duty mixing equipment by maintaining the solvent-soluble polymer content of the agitated alcoholysis mixture at such a low level that only a dilute and, therefore, a weak and readily comminuted gel structure is formed. Generally, the concentration of soluble polymer in the mixture is maintained so as not to exceed 1% by weight and most preferably not more than about 0.5%. At such soluble polymer concentrations, the gel structure formed is readily broken up by even mild agitation into small particles. However, because the gel is so dilute, the small particles formed undergo considerable size reduction on loss of solvent by synersis of the gel during the later stages of the alcoholysis. As a result, the process of Patent 2,734,048 characteristically produces polyvinyl alcohol products consisting predominately of particles having diameters of less than 50 microns. Such finely divided products are distinctly disadvantageous since they are dusty and present both explosion and health hazards.

A highly practical way of overcoming the above disadvantages of the method of Patent 2,734,048 is described in Tanner U.S. Patent 3,296,236. The improvement there described involves feeding the polyvinyl ester solution in the hydrolytic alcohol to the agitated alcoholysis reaction mixture in intermittent portions of such size that the mixture thickens as each intermittently fed portion passes through the gel phase, with the time interval between succeeding intermittent portions being sufficient for the alcoholysis mixture to revert to a non-thickened condition after each such intermittent portion of the feed passes through the gel stage and before the next such succeeding portion passes into the gel phase. In such a "slug feed" method, the feeding of the polyvinyl ester solution to the alcoholysis mixture in intermittent portions or "slugs" avoids a set-up alcoholysis vessel because each individual feed slug passes through the gel phase before the next feed slug arrives at the gel phase, so that the gel from one slug does not reinforce the gel of the preceding slug.

It is a phenomenon of the above slug feed method that the alcoholysis catalyst, e.g., sodium methylate, in the alcoholysis mixture is preferentially absorbed in the solid polyvinyl alcohol phase where its concentration may be many, e.g., two to over 100, fold greater than in the liquid phase of the mixture. This distribution of catalyst is caused by the by-product methyl acetate which reduces the solubility of the catalyst causing it to migrate into the solid polyvinyl alcohol phase with its multitude of compatible hydroxyl groups. Granules of polyvinyl alcohol in the mixture are, therefore, sources of high catalyst concentration. As those granules become coated with a layer of polyvinyl acetate from each intermittent slug of the latter, the coating rapidly alcoholizes as a film on the granules. Conversely, the solvent phase of the mixture is a lower-catalyst concentration environment in which alcoholysis proceeds as a relatively slow rate. Thus, most of the polyvinyl acetate fed alcoholizes on the polyvinyl alcohol granules. This phenomenon involving the formation of layered films of alcoholized products upon granules of such product is called "polymer layering," and is the phenomenon that comes into effect in the above "slug feed" method which results in the production of granular rather than finely divided dusty products.

Instead of feeding all of the starting polyvinyl acetate solution in slugs as indicated above, part of the solution may be fed continuously while the remainder is fed superimposed as separate intermittent portions or "pulses" so as to provide distinct alternating periods of thickened and non-thickened conditions in the alcoholysis mixture. This method of operating is conveniently referred to as the "pulse feed" method.

While the above "slug feed" and "pulse feed" methods are highly effective in producing granular rather than finely divided dusty polyvinyl alcohol products, they are rather expensive to operate in that relatively expensive and complicated computerized feeding systems are required. The method of the present invention provides an improved alcoholysis method which produces granular, essentially dust-free, polyvinyl alcohol products fully equivalent of those obtained by the above methods, which improved method can be practiced employing equipment that is much less expensive to build, operate and maintain.

SUMMARY OF THE INVENTION

The invention relates to a continuous method for effecting the alcoholysis of polyvinyl esters to produce granular, relatively dust free, polyvinyl alcohol products. In accordance with the method of the invention, a solution of a 10–40% alcoholized polyvinyl ester in a solvent mixture of a hydrolytic alcohol and the ester of that alcohol with the acid residue of the polyvinyl ester is fed continuously to an agitated alcoholysis mixture at such a rate that the concentration of dissolved polymer in the alcoholysis mixture does not exceed about 1% by weight, while maintaining in the alcoholysis mixture an effective concentration of an alcoholysis catalyst, and continuously withdrawing from the alcoholysis mixture a slurry of granular polyvinyl alcohol in the solvent mixture of the hydrolytic alcohol and the ester thereof with the acid residue of the polyvinyl ester.

The feed solution of the 10–40% alcoholized polyvinyl ester may be prepared by effecting the partial, i.e., 10–40%, alcoholysis of the polyvinyl ester either batchwise or continuously.

DETAILED DESCRIPTION AND PREFERRED EMBODIMENTS

The starting feed solution for the method of the invention, i.e., a 10–40% alcoholized polyvinyl ester solution, hereinafter referred to as the "partially pre-alcoholized solution," may be prepared by alcoholizing a solution of a polyvinyl ester in a hydrolytic alcohol in the presence of an alcoholysis catalyst in any desired manner. Thus, the pre-alocholysis required to produce such a partially pre-alcoholized polyvinyl ester solution can be effected either batchwise or continuously. If a batchwise method is employed, the partially pre-alcoholized reaction mixture should be neutralized to destroy the alcoholysis catalyst when the desired degree of pre-alcoholysis has been achieved in order to prevent alcoholysis proceeding beyond the desired extent prior to use of the pre-alcoholized solution in the method of the invention. On the other hand, if the pre-alcoholysis is carried out by a continuous method and the partially pre-alcoholized polyvinyl ester solution so obtained is to be continuously used immediately upon formation in practicing the method of the invention, destruction of the alcoholysis catalyst before the solution is used in accordance with the invention is unnecessary.

The partially pre-alcoholized polyvinyl ester that is used as the feed material should be prepared by effecting the partial pre-alcoholysis of the polyvinyl ester in a 20–65% solution thereof in the hydrolytic alcohol. Conveniently, the alcoholysis catalyst, e.g., as a solution thereof in the hydrolytic alcohol, is added to such a solution of the polyvinyl ester, following which alcoholysis is permitted to proceed until at least 10%, but not more than 40%, alcoholysis has resulted. The pre-alcoholysis reaction is then stopped by neutralizing the alcoholysis catalyst whereby a solution of the pre-alcoholized polyvinyl ester in a mixture of the hydrolytic alcohol and by-product ester, e.g., a mixture of methanol and methyl acetate, is obtained. The resulting solution can then be employed as the continuous feed solution to the alcoholysis mixture in practicing the method of the invention.

As indicated, the polyvinyl ester solution employed to produce the starting partially pre-alcholized feed solution will generally consist of a 20–65% solution of the polyvinyl ester in the hydrolytic alcohol. Less concentrated solutions can be used, but are generally not desirable because of the expense involved in handling such dilute solutions. More concentrated solutions are not generally suitable in that they give non-homogeneous final polyvinyl alcohol products. The preferred solutions will contain from about 25–55% of the polyvinyl ester in the hydrolytic alcohol. When such solutions are partially pre-alcoholized, the resulting solution will be that of the partially pre-alcoholized polymer in a mixture of the hydrolytic alcohol and the by-product ester, the proportions of the two solvents in the solvent mixture depending upon the extent of the pre-alcoholysis. The minimum proportion of by-product ester in the solvent mixture will be that resulting from a pre-alcoholysis of only 10%, whereas the maximum proportion will be that resulting from a 40% alcoholysis. The solvent component of the partially pre-alcoholized polyvinyl acetate solution when the hydro alcohol is methanol will generally contain from about 6 to about 30% methyl acetate, preferably 7.5 to 26%, with the balance being methanol.

Various polyvinyl esters, e.g., polyvinyl formate, polyvinyl acetate, polyvinyl propionate, polyvinyl butyrate, and the like, can be used in preparing the partially pre-alcoholized polyvinyl ester solution, but for reasons of economy, ready availability and excellent performance, polyvinyl acetate will most generally be employed.

The hydrolytic alcohols that can be employed both in the preparation of the partially pre-alcoholized polyvinyl ester and in the production of polyvinyl alcohol in accordance with the invention include methanol, ethanol, the propanols and the monomethylether of ethylene glycol, etc. However, for reasons of economy and excellent performance, methanol is the preferred hydrolytic alcohol. Whichever alcohol is used, the by-product liquid ester resulting will be the ester of that alcohol with the acid residue of the polyvinyl ester. Thus, when alcoholizing polyvinyl acetate with methanol, the by-product ester will be methyl acetate.

Both acidic and alkaline materials may be employed to catalyze the alcoholysis reaction. Examples of suitable acid catalysts are sulfuric acid, hydrogen chloride and p-toluene sulfonic acid. Examples of suitable alkaline catalysts are the alkali metal hydroxides and alcoholates. Both types of these alkaline catalysts can be employed at temperatures below about 40° C., but at higher temperatures the alkali metal hydroxides react with the polyvinyl ester or the by-product liquid ester by saponification, and are thereby consumed. Accordingly, use of metal hydroxides as catalysts is not generally practiced at temperatures above 40° C. The preferred catalysts are the alkali metal alcoholates especially sodium methylate. They are especially effective at such higher temperatures and their use results in a much more rapid alcoholysis than when acidic catalysts are employed.

It has been found, quite surprisingly, that the highly desirable granular and essentially dust-free type polyvinyl alcohol products which are obtainable by the relatively complicated and expensive "slug feed" and "pulse feed" method of Tanner Patent 3,296,236, are also readily obtainable by the relatively simple and inexpensive continuous feed method of Bristol and Tanner Patent 2,734,048, provided that the latter method be modified by employing as the feed material a solution of a 10–40% pre-alcoholized polyvinyl ester in a solvent mixture of the hydrolytic alcohol and the by-product ester. As has been indicated previously in connection with the above Tanner patent, the production of granular dust-free product requires that a major portion of the alcoholysis occur upon polyvinyl alcohol particles present in the alcoholysis mixture by the polymer layering phenomenon. Such a phenomenon occurs because of the relatively high concentration of catalyst in the polyvinyl alcohol particles and the relatively low concentration of catalyst in the solution phase of the mixture. While such polymer layering effect will occur in the continuous feed alcoholysis method of the Bristol and Tanner patent, the extent to which such polymer layering effect will be realized will be substantially less than will be the case in the modified method of the present invention. This is because the liquid phase of the alcoholysis mixture in the case of the present method will always contain a much higher concentration of soluble polymer which is at the verge of entering the gel or insoluble stage than would ever be the case in the method of the patent. Because of this high concentration of material on the verge of entering the gel stage, the polymer layering effect is greatly enhanced with the result that granulation of the polyvinyl alcohol product proceeds at the expense of the formation of excessive amounts of new polyvinyl alcohol particles.

In order that the desired granulation effect be sufficiently enhanced to avoid excessive formation of small sized polyvinyl alcohol particles which yield dusty material, it is essential that the polyvinyl ester solution that is continuously fed to the alcoholysis mixture be pre-alcoholized to the extent of at least 10%. On the other hand, the extent of the pre-alcoholysis should not be greater than about 40%, otherwise, the feed solution will be too viscous to permit its uniform distribution throughout the alcoholysis mixture prior to gelation thereof occurring. Use of polyvinyl esters pre-alcoholized to the extent of about 13-28% is preferred.

As is the case in the method of Patent 2,734,048, it is necessary in the present method that the polymer solution which is continuously fed to the alcoholysis mixture be fed at a rate such that the concentration of dissolved polymer in the alcoholysis mixture will not exceed about 1% of the weight of the mixture and preferaby will not exceed about 0.5%. If higher feed rates are empoyed, the alcoholysis mixture will set-up to a non-moving gel which cannot be effectively agitated except by the use of heavy-duty mixing equipment such as kneaders.

There should, of course, be present in the alcoholysis mixture at all times an effective concentration of the alcoholysis catalyst. This can be readily provided by feeding the catalyst separately to the alcoholysis mixture at a rate such as to provide the desired catalyst concentration in the alcoholysis mixture. Most conveniently, the catalyst will be added at an appropriate continuous rate in the form of a solution of the catalyst in the hydrolytic alcohol. Catalyst concentrations may be varied considerably depending upon the alcoholysis rate desired and the temperature employed. In general, temperatures of from about 0° C. up to just below the temperature at which the polyvinyl alcohol will decompose, e.g., about 200° C., are generally usable, but those of from about 25 to about 65° C. are preferred. Over the broad temperature range indicated, catalyst concentrations ranging from about 0.01 to as much as 5% of the weight of the alcoholysis mixture are generally usable with the higher amounts of catalysts being employed at the lower temperatures. The preferred catalyst concentrations are 0.1 to 0.5% when operating in the preferred temperature range.

The improved method of the invention is illustrated by the following example. In the example, and elsewhere herein, all composition percentages are by weight.

EXAMPLE

The following three solutions were prepared:

Solution A.—a solution composed of 37.3% polyvinyl acetate which had been 14% alcoholyzed, 58% methanol and 4.7% methyl acetate;

Solution B.—a 10% solution of sodium methylate in methanol; and

Solution C.—a mixture consisting of 60% methyl acetate and 40% methanol.

Solution A was prepared by partially alcoholyzing an agitated batch of a 42% solution of polyvinyl acetate in methanol at 25° C. in the presence of 0.08% (based upon the batch weight) of sodium methylate. The alcoholysis reaction was stopped after 14 minutes by neutralizing the batch with glacial acetic acid. At that point, the alcoholysis was 14% complete and the resulting solution was of the composition indicated for Solution A.

Three vessels were provided for the continuous flow of material consecutively therethrough. The first vessel was jacketed 1500 ml. vessel provided with a paddle agitator and a continuous overflow tube leading to a second jacketed 1500 ml. vessel also provided with a paddle agitator. The second vessel was provided with a bottom outlet and an automatic level controller by which the level of material therein was controlled at about the 1000 ml. level. The bottom outlet of this vessel led to the third vessel which was a jacketed 1000 ml. vessel also provided with a paddle agitator. During the alcoholysis operation to be described, the water flows through the jackets of the vessels were such as to maintain the contents of the first vessel at 45° C. and the contents of the other vessels at 55° C. Before start of the alcoholysis operation, the first vessel was filled with Solution C and sufficient of catalyst Solution B to provide in the resulting mixture a sodium methylate concentration of 0.4%. The second vessel was filled to the 1000 ml. level with Solution C and sufficient of the catalyst Solution B to provide a sodium methylate concentration in the contents of that vessel of 0.4%. The third vessel was filled to the 500 ml. level with Solution C and sufficient of catalyst Solution B to provide in the contents of that vessel a sodium methylate concentration of 0.4%.

The alcoholysis operation was carried out, after filling the three vessels as indicated, by continuously feeding Solution A to the first vessel at the rate of 8 g. per minute while also continuously feeding thereto Solution B at a rate such as to maintain the sodium methylate concentration in the first vessel at a concentration of 0.4 to 0.35%. Product slurry continuously withdrawn from the third vessel at a rate equal to materials fed to the first vessel was neutralized with glacial acetic acid and filtered. The filter cake was washed with three increments of methanol, each increment being of a size equal to that of the initial filtrate from the first filtration, following which it was dried in a vacuum oven at 60° C. for 14 hours. The dry product was screen tested to determine its particle size distribution. The results are tabulated below:

| Screen fractions (U.S. Sieve Scale): | Percent |
|---|---|
| On 20 mesh | 0.00 |
| Through 20 and on 40 mesh | 2.88 |
| Through 40 and on 100 mesh | 78.60 |
| Through 100 and on 200 mesh | 8.89 |
| Through 200 and on 270 mesh | 0.74 |
| Through 270 mesh | 8.89 |
| | 100.00 |

It will be seen from the above data that the product was relatively free of material finer than 100 mesh (149 microns in diameter) and contained less than 10% of material finer than 270 mesh (53 microns in diameter). The product showed only a trace of dustiness and for practical purposes could be considered as being dust free.

For comparison purposes, the procedure of the above example was repeated except that the continuous feed procedure of the Bristol and Tanner Patent 2,734,048 was practiced. Thus, instead of employing as the feed solution a solution of pre-alcoholized polyvinyl acetate, i.e., Solution A of the above example, the feed solution consisted of a 40% solution of unalcoholized polyvinyl acetate in methanol. Except for the use of a feed solution of this composition in place of Solution A of the above example, the procedure described in the above example was followed throughout. The dry product obtained gave the following screen test results:

| Screen fractions (U.S. Sieve Scale): | Percent |
|---|---|
| On 20 mesh | 0.00 |
| Through 20 and on 40 mesh | trace |
| Through 40 and on 100 mesh | trace |
| Through 100 and on 200 mesh | trace |
| Through 200 and on 270 mesh | 1.90 |
| Through 270 mesh | 98.10 |
| | 100.00 |

The above product was very dusty, which property is characteristic of product obtained by the method of the Bristol and Tanner patent. It will be seen from the above screen test data that it consisted almost entirely of product finer than 270 mesh (53 microns in diameter) and in this respect was markedly different from the product obtained by the procedure of the above example.

Not only can the procedure of the present invention be employed to produce granular and essentially dust-free polyvinyl alcohol product; it can also be practiced to upgrade finely divided and dusty polyvinyl alcohol products by feeding such dusty material into the alcoholysis mixture in which the alcoholysis is being carried out in accordance with the present invention. When finely divided and dusty polyvinyl alcohol product is fed into the alcoholysis mixture as indicated, the polyvinyl alcohol particles so fed to the mixture will constitute solid polyvinyl alcohol sites upon which dissolved polymer will layer and become completely alcoholized, thus increasing the particle size of the initially finely divided particles. The polyvinyl alcohol fines whose particle sizes are to be increased in this manner may be fed in dry form separately to the alcoholysis mixture. Alternatively, a slurry of such fines in the feed solution of the partially pre-alcoholized polymer may be fed to the alcoholysis mixture. The amount of polyvinyl alcohol fines thus fed to the alcoholysis system should generally not exceed about 150% of the weight of the partially pre-alcoholized polyvinyl acetate that is fed to the alcoholysis mixture. Preferably, the amount will not exceed 50%.

I claim:

1. In a method for the production of polyvinyl alcohol by the catalyzed alcoholysis of a polyvinyl ester in which a solution of the polyvinyl ester in a hydrolytic alcohol is continuously fed to an agitated alcoholysis mixture in which mixture there is maintained an effective concentration of an alcoholysis catalyst and from which mixture there is continuously withdrawn a slurry of the polyvinyl alcohol product in a solvent mixture comprising said hydrolytic alcohol and the by-product ester of said hydrolytic alcohol with the acid residue of said polyvinyl ester, said solution of the polyvinyl ester being fed to said alcoholysis mixture at a rate such that the concentration of dissolved polymer in said alcoholysis mixture does not exceed about 1% of the weight of said alcoholysis mixture, the improvement comprising employing as the polyvinyl ester feed solution a solution of a 10 to 40% alcoholized polyvinyl ester in a solvent mixture of said hydrolytic alcohol and 6 to 30% by weight of said by-product ester.

2. The method of claim 1 wherein an alkaline alcoholysis catalyst is employed.

3. The method of claim 1 wherein an alkali metal alcoholate is employed as the alcoholysis catalyst and the alcoholysis is effected at a temperature of 25 to 65° C.

4. The method of claim 1 wherein the feed solution is a 20 to 65% solution of 10 to 40% alcoholized polyvinyl acetate in a solvent mixture comprising 6 to 30% methyl acetate and 94 to 70% methanol, the alcoholysis catalyst is sodium methylate, and the alcoholysis is effected at 25 to 65° C.

5. The method of claim 4 wherein the feed solution is a 25 to 55% solution of a 13 to 28% alcoholized polyvinyl acetate in a solvent mixture comprising 7.5 to 26% methyl acetate and 92.5 to 74% methanol.

References Cited

UNITED STATES PATENTS

| 2,734,048 | 2/1956 | Bristol et al. | 260—91.3 |
| 3,296,236 | 1/1967 | Tanner | 260—91.3 |

JOSEPH L. SHOFER, Primary Examiner

STANFORD M. LEVIN, Assistant Examiner

U.S. Cl. X.R.

260—91.3